F. W. ZINGSHEIM.
PUMP BASE.
APPLICATION FILED MAY 26, 1919.
1,329,281. Patented Jan. 27, 1920.
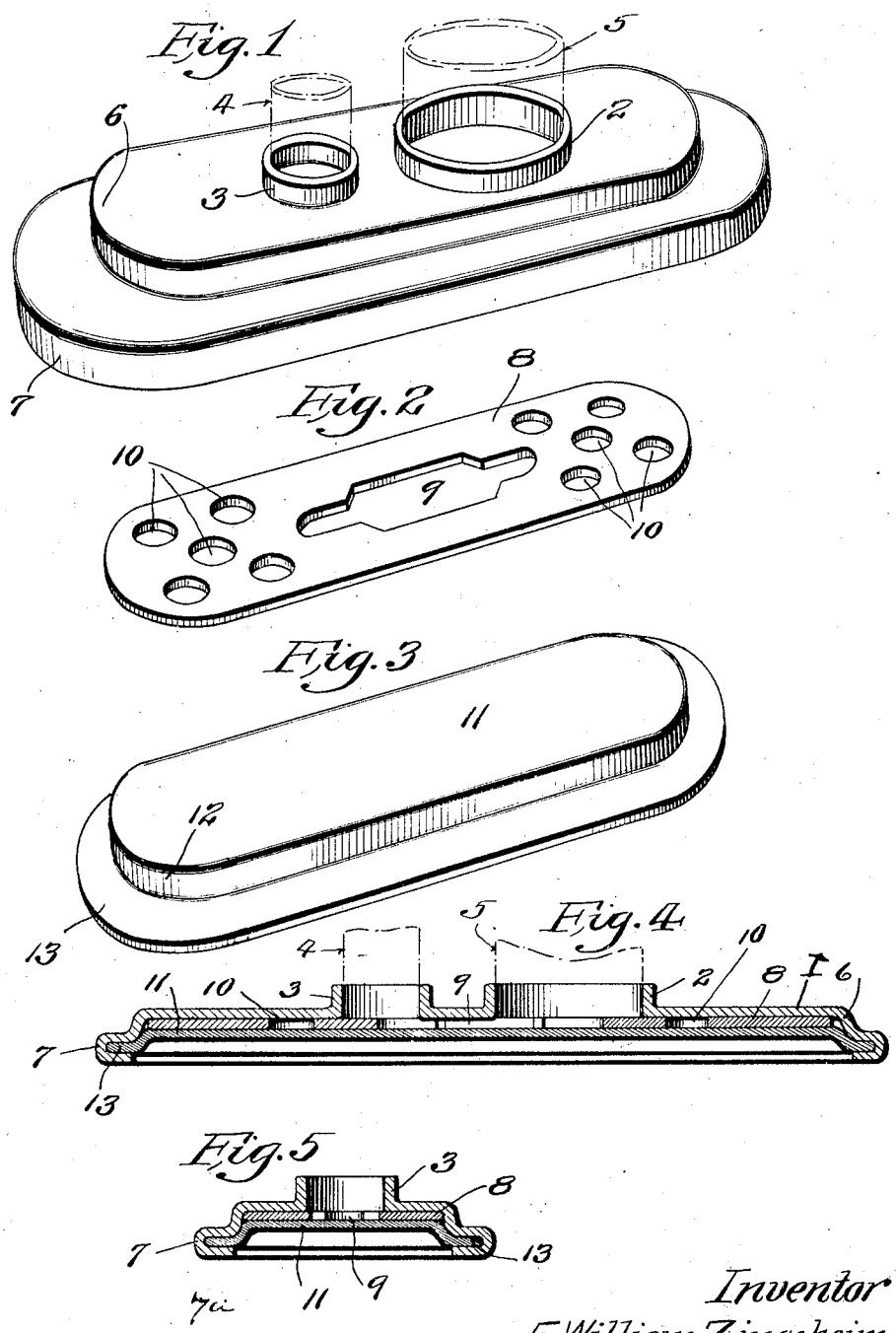
Inventor
F. William Zingsheim

UNITED STATES PATENT OFFICE.

FREDERICK W. ZINGSHEIM, OF FERGUSON, MISSOURI, ASSIGNOR TO MOON BROTHERS MANUFACTURING COMPANY, OF ST. LOUIS, MISSOURI, A CORPORATION OF MISSOURI.

PUMP-BASE.

1,329,281.     Specification of Letters Patent.     Patented Jan. 27, 1920.

Application filed May 26, 1919. Serial No. 299,767.

*To all whom it may concern:*

Be it known that I, FREDERICK W. ZINGSHEIM, a citizen of the United States, residing at Ferguson, St. Louis county, Missouri, have invented a certain new and useful Improvement in Pump-Bases, of which the following is a full, clear, and exact description, such as will enable others skilled in the art to which it appertains to make and use the same, reference being had to the accompanying drawings, forming part of this specification, in which—

Figure 1 is a detail view of the top plate of my improved pump base.

Fig. 2 is a similar view of the intermediate or spacing plate.

Fig. 3 is a detail view of the bottom plate.

Fig. 4 is a longitudinal sectional view, and

Fig. 5 is a cross sectional view.

This invention relates to a new and useful improvement in pump bases designed particularly for use in connection with pumps which are employed for inflating automobile tires, bicycle tires, etc.

The object of my invention is to form a base of pressed metal parts thereby making it strong and not liable to breakage in the event that the pump is dropped on a hard surface or floor, as is liable to happen where the base is made of gray iron casting, as is frequently practised.

Another object of my invention is to make the base as light as possible, and so construct the pressed plates that they cannot be easily bent and destroyed in service.

In the drawings, 1 indicates the top plate having circular embossed flanges 2 and 3 for the reception of the pump cylinders 4 and 5 indicated by dotted lines. These pump cylinders may be soldered or otherwise secured in position in the flanges 2 and 3. This top plate 1 is formed with a shoulder 6 for purposes of reinforcement and is also provided with a marginal downwardly extending flange 7.

8 indicates an intermediate plate having an elongated slot 9 arranged therein approximately at its central portion, said slot being of such length as to extend beyond openings formed by the flanges 2 and 3 irrespective of the manner in which the plate 9 may be placed in position. 10 are lightening openings formed in the ends of the plate 8, these openings being preferably punched out at the time that plate 8 is formed and the material punched therefrom used as washers in the construction of other parts of the pump. The dimensions of plate 8 are preferably such that they fit snugly within the shoulders formed by the reinforcing embossed shoulder 6.

11 indicates the bottom plate which is provided with a reinforcing shoulder 12 and an outwardly extending marginal flange 13.

In assembling the parts, the plate 8 is arranged on the under face of the top plate, after which the bottom plate is placed in position and the marginal flange 7 of the top plate is folded inwardly as at 7ª to form an air tight joint and at the same time firmly secure the intermediate plate 8 in position. The refolded flange 7ª also adds to the strength of the pump base.

What I claim is:

1. A pump base formed with flanged openings for the reception of the pump cylinders and having a reinforcing shoulder and a depending marginal flange, an intermediate plate formed with an opening for establishing communication between the openings in the top plate, a bottom plate having a reinforcing shoulder and an outwardly extending marginal flange, said top plate being folded under the flange or bottom plate.

2. In a pump base, the combination of a reinforced top plate provided with flanged openings and a depending marginal flange, the reinforcement of said top plate forming a downwardly depending pocket therein, an intermediate plate provided with an elongated opening for establishing communication between the openings in the top plate, said intermediate plate having lightening openings in its ends which are separate from and not in communication with the opening first mentioned, and a bottom plate having an upwardly extending reinforced portion and an outwardly extending marginal flange under which latter the marginal flange of the top plate is folded or bent.

In testimony whereof I hereunto affix my signature this 23d day of May, 1919.

FREDERICK W. ZINGSHEIM.